(No Model.) 8 Sheets—Sheet 1.

H. W. MORGAN.
NAILING MACHINE.

No. 587,321. Patented Aug. 3, 1897.

WITNESSES:
INVENTOR:

(No Model.)　　　　　　　　H. W. MORGAN.　　　　8 Sheets—Sheet 7.
NAILING MACHINE.

No. 587,321.　　　　　　　　　　　Patented Aug. 3, 1897.

WITNESSES　　　　　　　　　　　　　　INVENTOR.

(No Model.) 8 Sheets—Sheet 8.
H. W. MORGAN.
NAILING MACHINE.
No. 587,321. Patented Aug. 3, 1897.
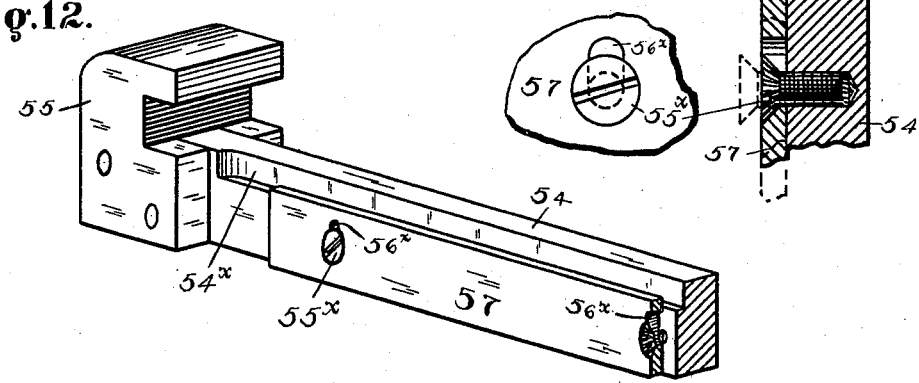
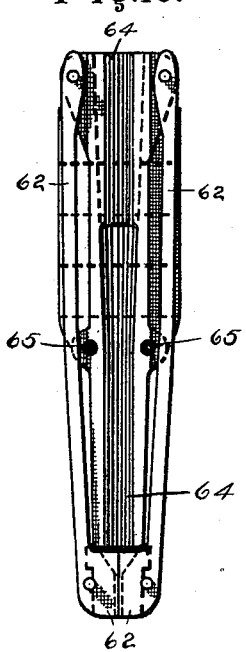
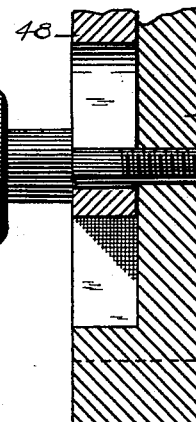
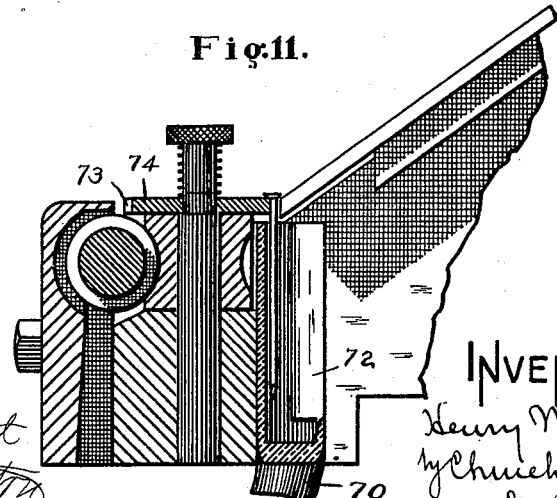
WITNESSES
Thomas Durant
John B. Peyton
INVENTOR
Henry W Morgan
by Church & Church
his Attorneys

UNITED STATES PATENT OFFICE.

HENRY W. MORGAN, OF ROCHESTER, NEW YORK.

NAILING-MACHINE.

SPECIFICATION forming part of Letters Patent No. 587,321, dated August 3, 1897.

Application filed December 9, 1896. Serial No. 615,002. (No model.)

*To all whom it may concern:*

Be it known that I, HENRY W. MORGAN, of Rochester, in the county of Monroe and State of New York, have invented certain new and useful Improvements in Nailing-Machines; and I do hereby declare the following to be a full, clear, and exact description of the same, reference being had to the accompanying drawings, forming a part of this specification, and to the reference-numerals marked thereon.

My present invention has for its object to improve the construction and operation of that class of nailing-machines particularly adapted for forming boxes, whereby the machine is readily adapted for forming the "made-up" or cleated ends of boxes and of nailing the parts of the box together to complete it, and whereby also the machine may be readily changed from making said heads or ends so as to nail boxes in the usual manner; and it further has for its object to improve the construction and operation of the machine as a whole; and to these and other ends it consists in certain improvements in construction and combinations of parts, all as will be hereinafter fully described, and the novel features pointed out in the claims at the end of this specification.

Figure 1:
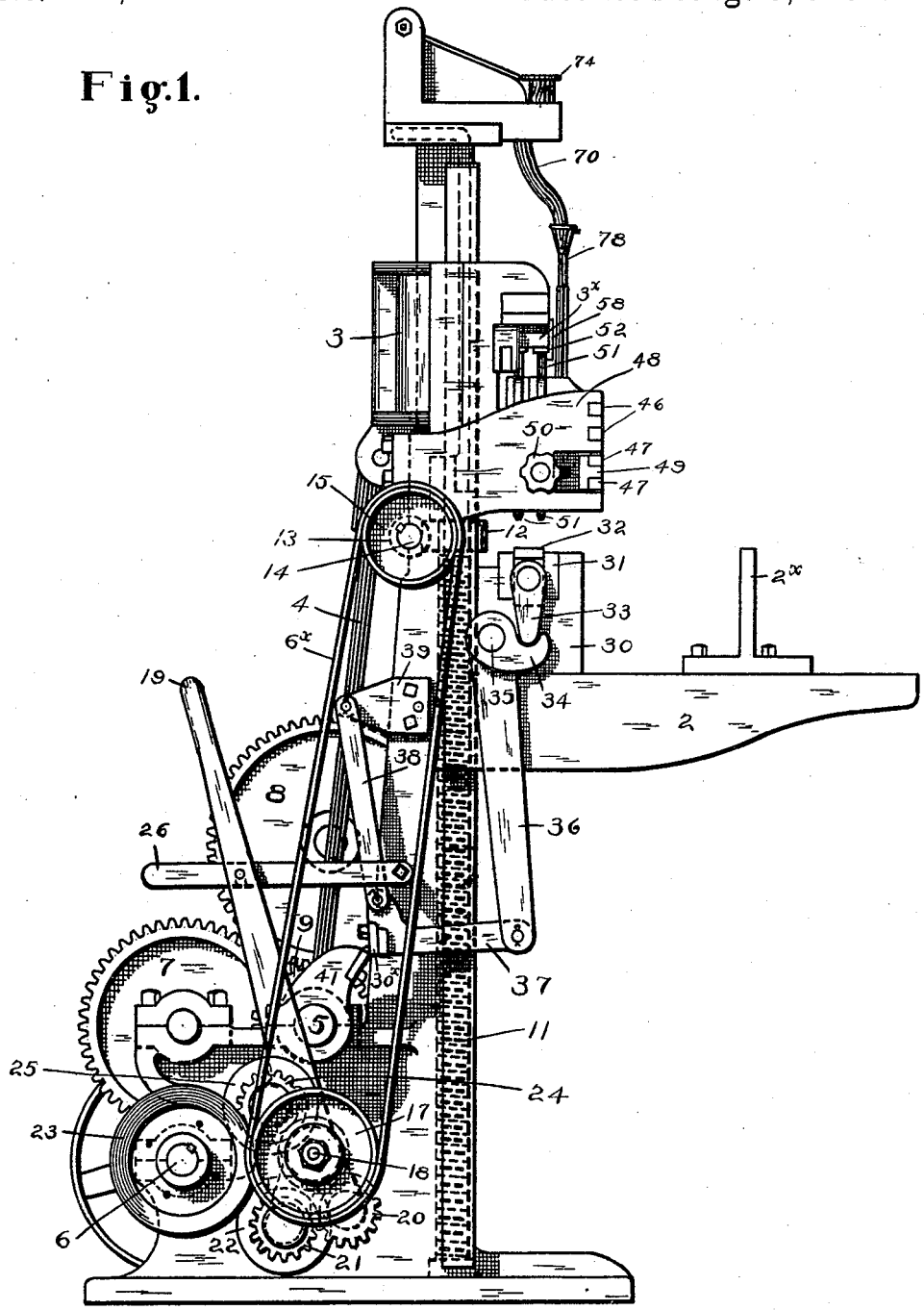
Figure 2:
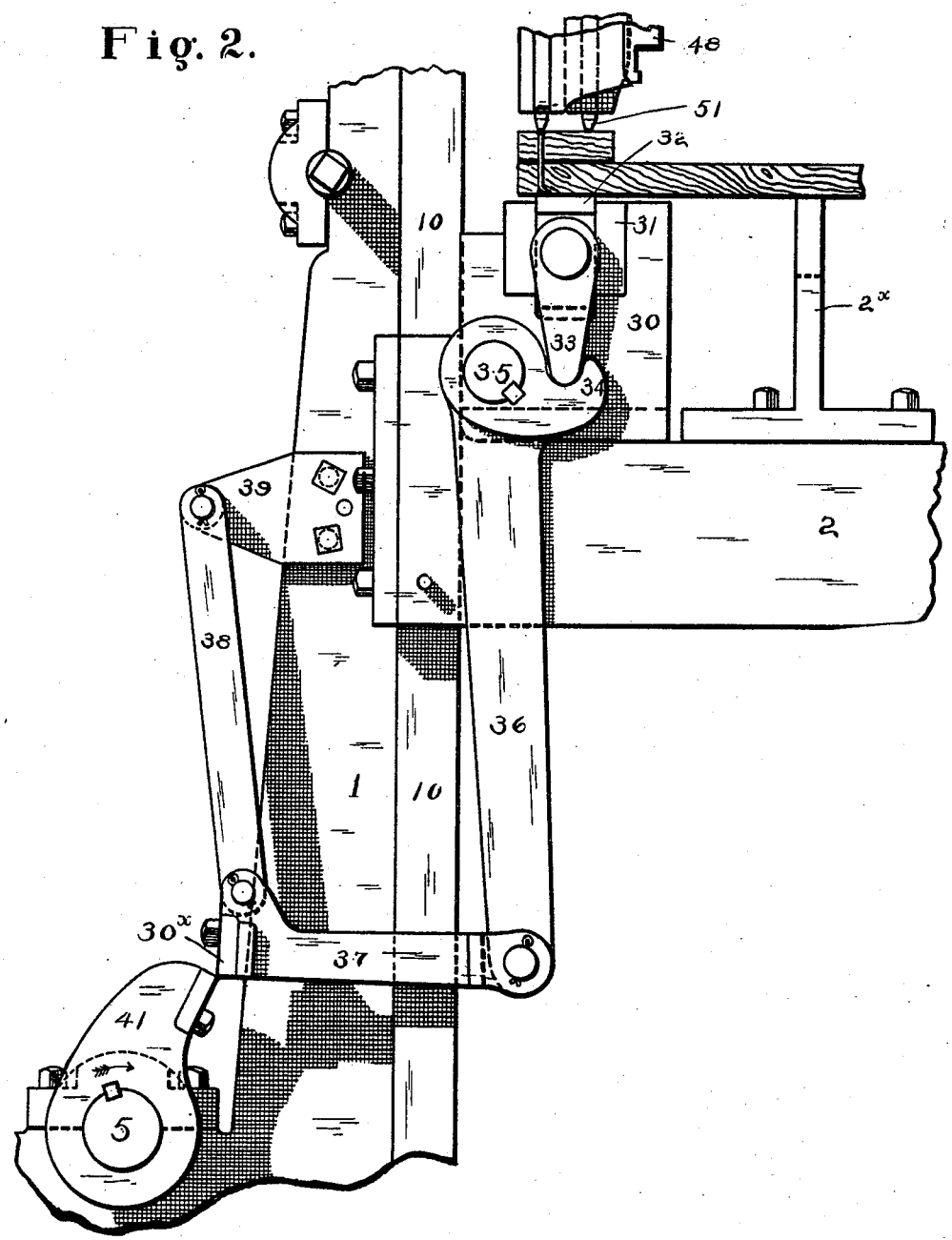
Figure 3:
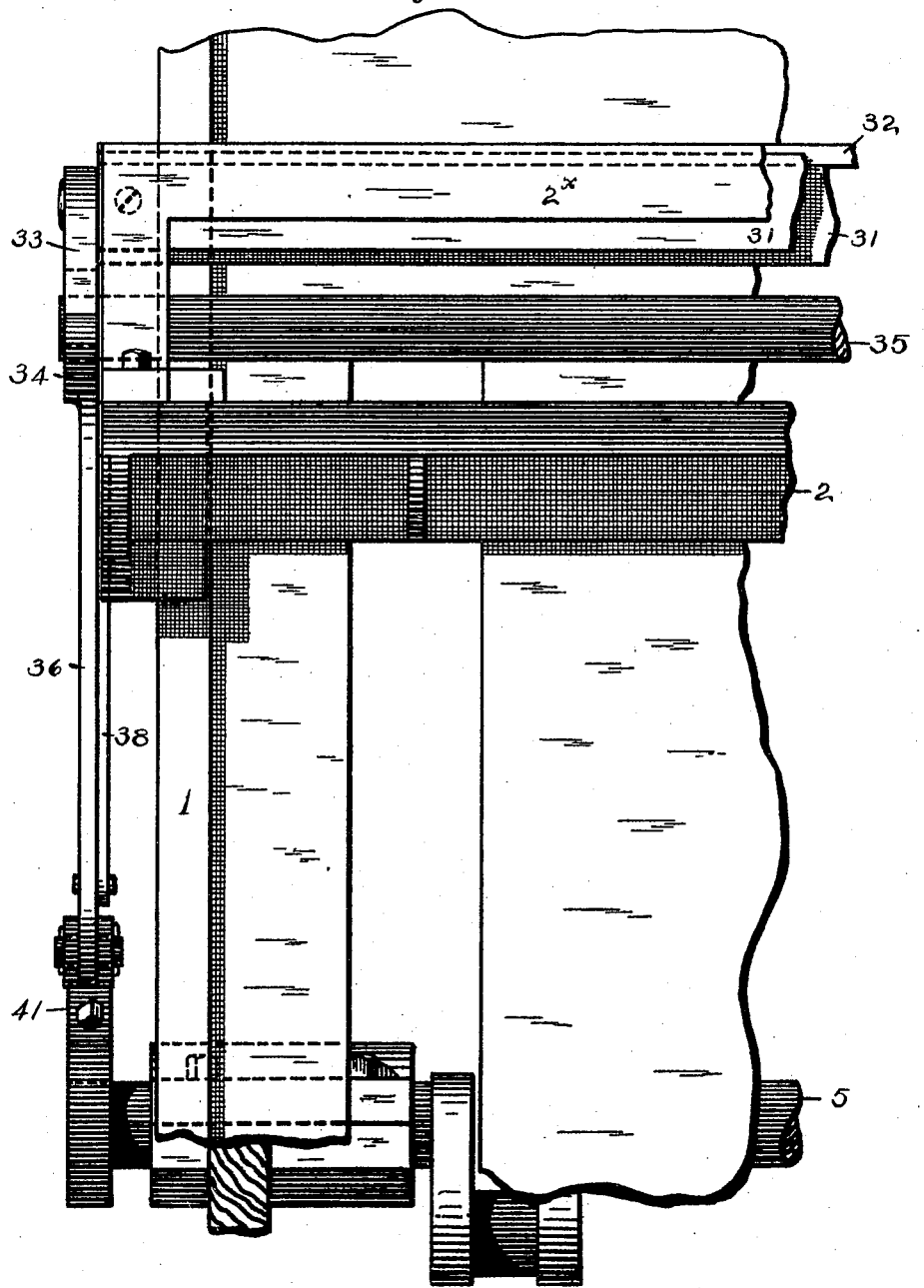
Figure 4:
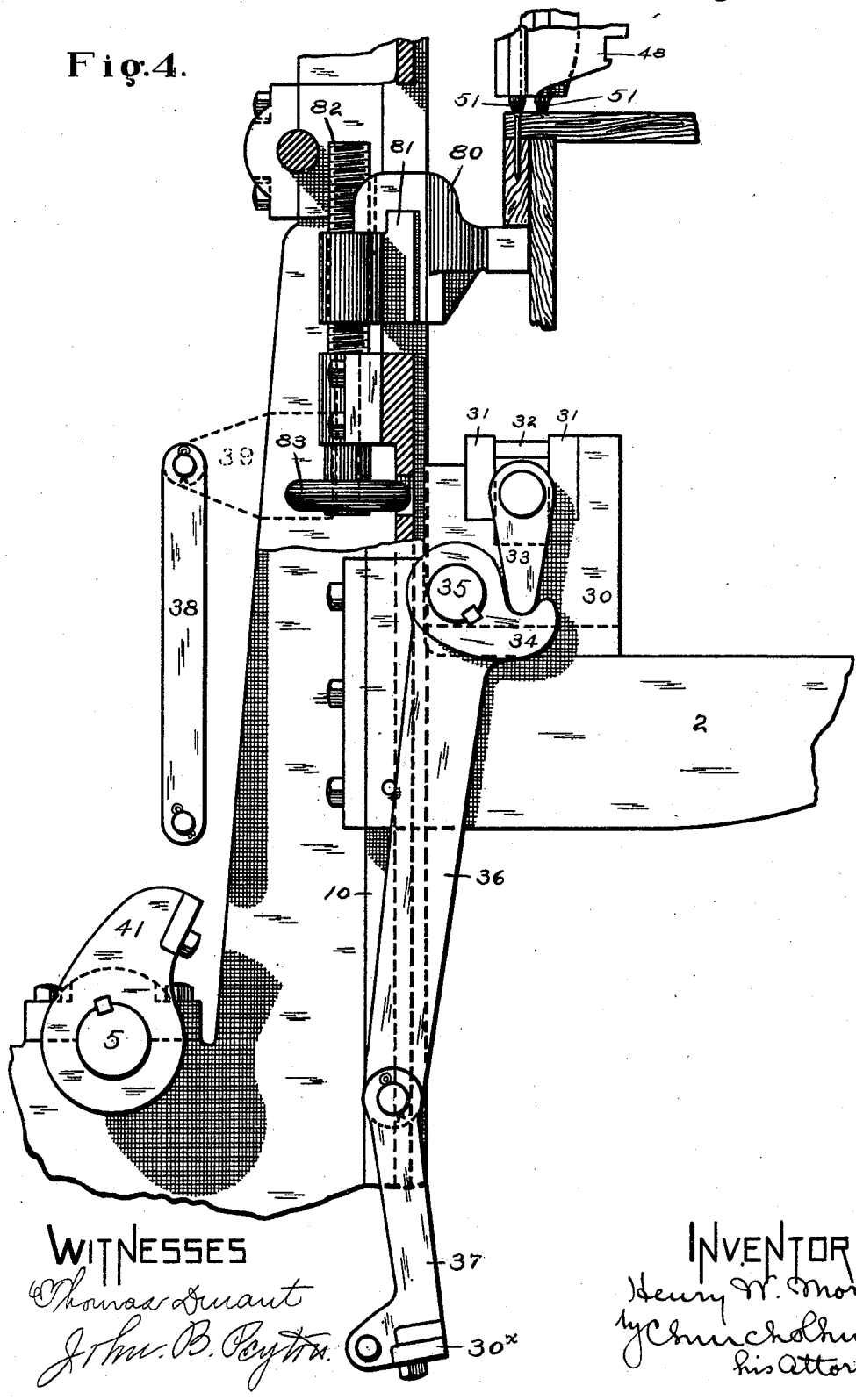
Figure 5:
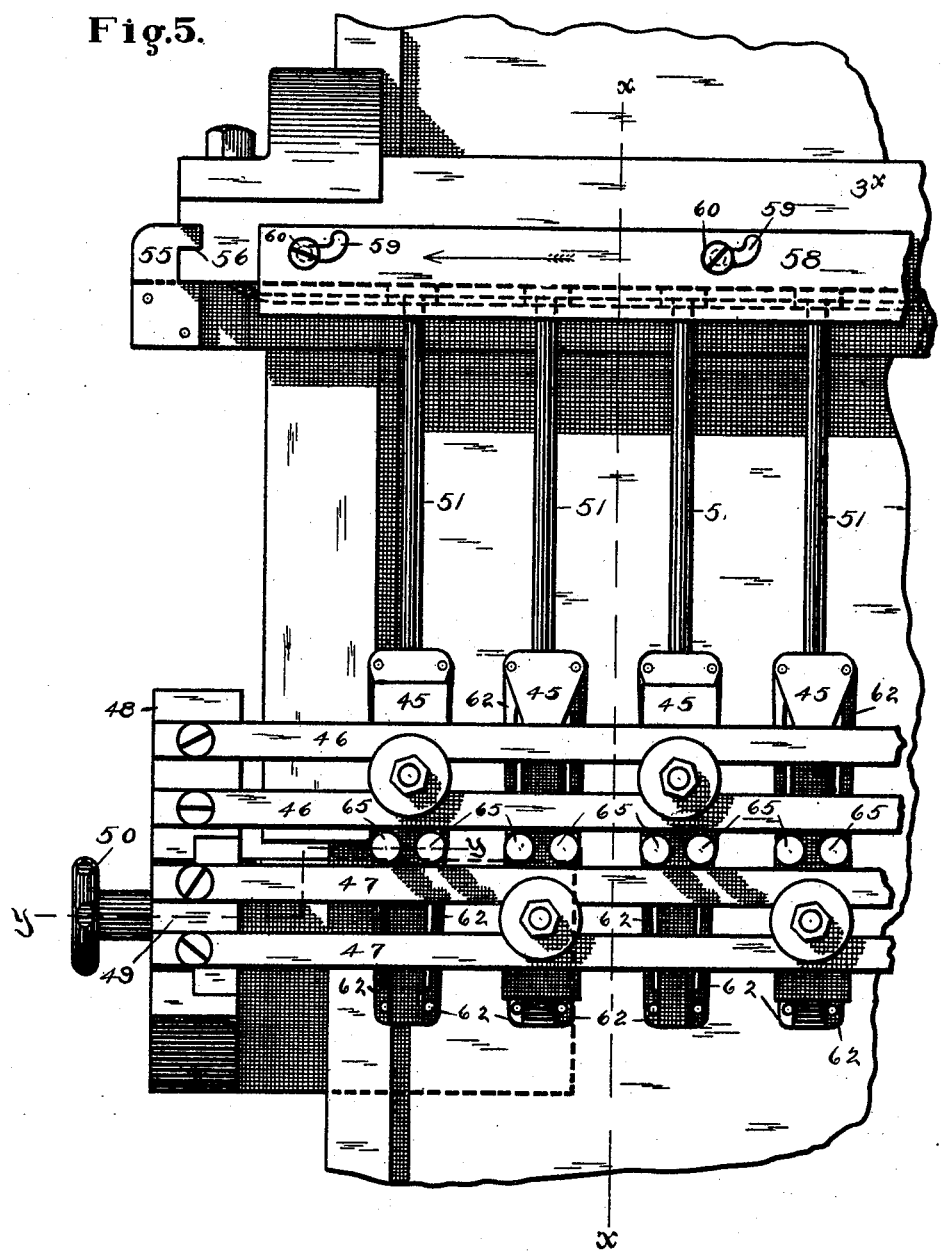
Figure 6:
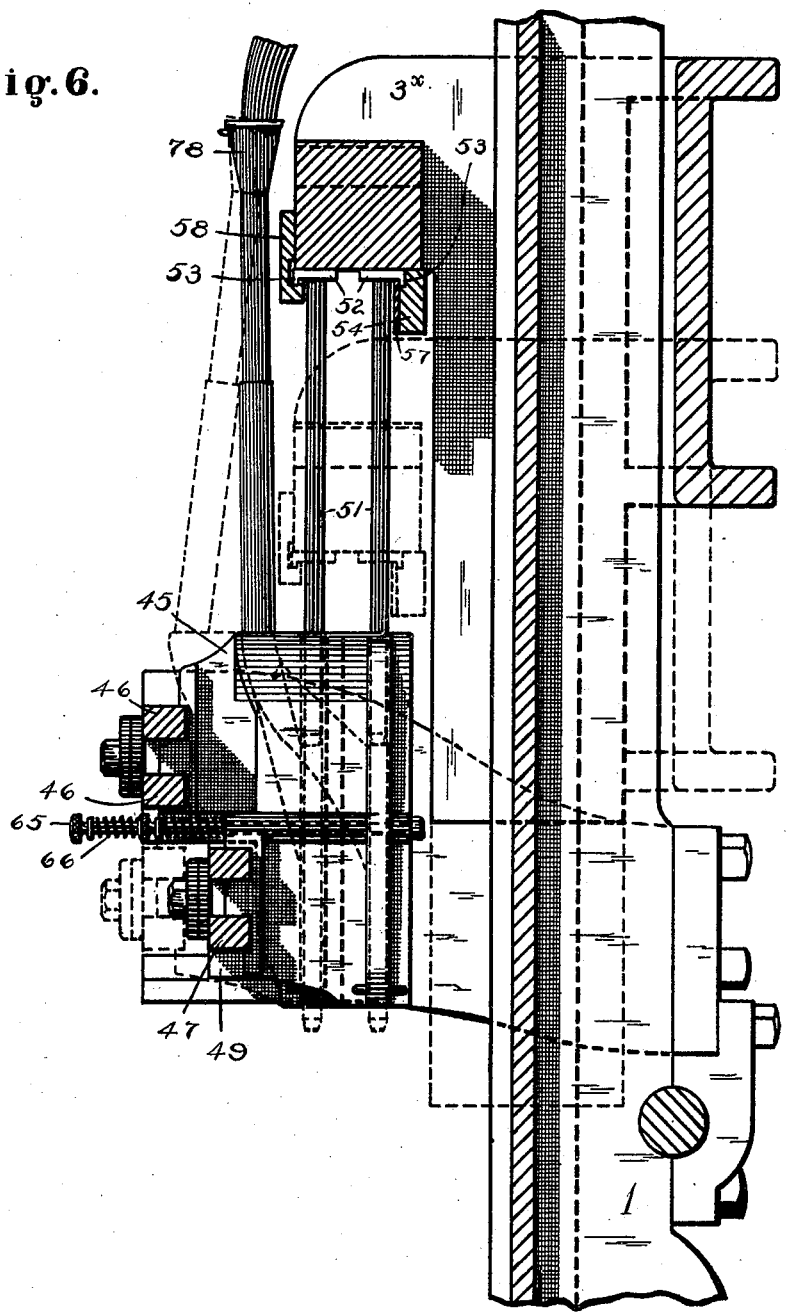
Figure 7:
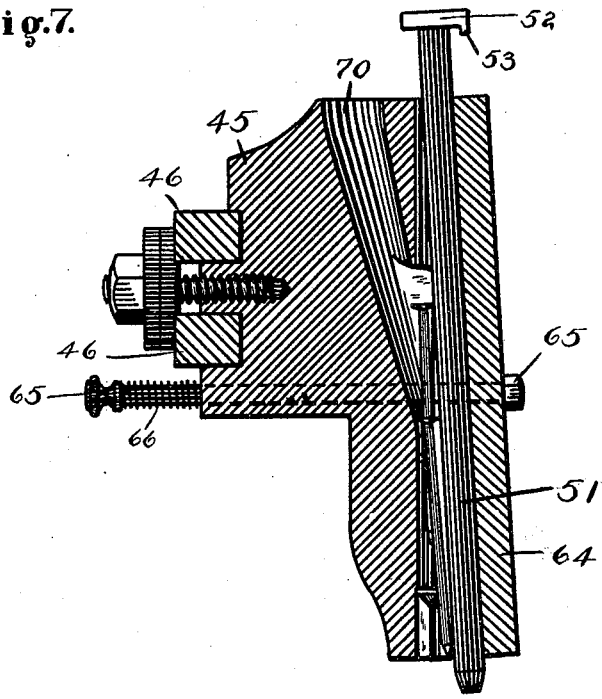
Figure 8:
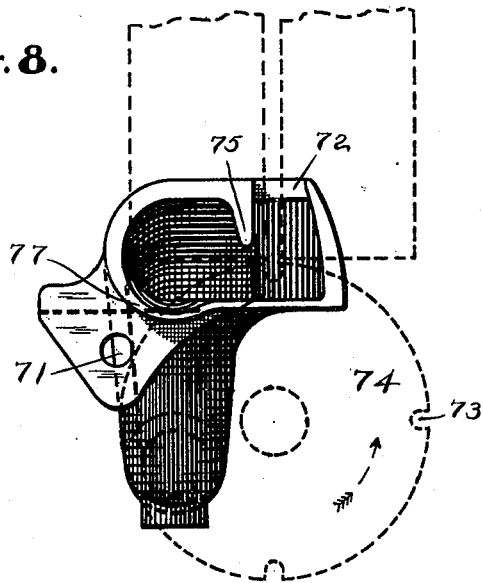

In the drawings, Figure 1 is a side elevation of a portion of a nailing-machine embodying my improvements, the nail-pan and operating devices being omitted; Fig. 2, a side elevation of the nail-clenching devices, showing the operation of nailing cleats to the box heads or ends; Fig. 3, a front elevation of a portion of the nail-clenching devices; Fig. 4, a sectional view through the center of the machine, showing particularly the device for holding the cleat while nailing one of the sides or covers to the box and in elevation the clenching device disconnected; Fig. 5, a front elevation of one end of the machine, showing the nail chucks or holders and the driver-bar, the nail-conductors being omitted; Fig. 6, a vertical sectional view on the line $x\ x$ of Fig. 5; Fig. 7, a vertical sectional view through one of the nail-holding chucks, showing the position of the parts when the nails are improperly positioned and the driver being moved down through the chuck; Fig. 8, a plan view of one of the nail-conductors, the nail-supports and selector being shown in dotted lines; Fig. 9, a horizontal sectional view on the line $y\ y$ of Fig. 5; Fig. 10, a vertical sectional view on the line $z\ z$ of Fig. 9; Fig. 11, a vertical sectional view through the nail-supports and the selector; Figs. 12 and 13, details of the support for the adjustable driver-support.

Similar reference-numerals in the several figures indicate similar parts.

The machine to which my improvements are applied is of a well-known type, and the specific form of the main frame not being of the essence of my invention I have not deemed it necessary to show the whole of it, the other side being similar to the one shown, and 1 represents the side of the usual frame, upon the upper end of which are mounted nail-feeding devices and upon which slides a suitable driver-frame 3, connected by a pitman 4 with a crank-shaft 5, arranged in suitable bearings on the main frame and operated from a main driving-shaft 6 through suitable gearing, as 7 and 8, a suitable clutch being interposed as usual between the two shafts 5 and 6, so that the driver-frame will make one reciprocation and then stop until released again by the operator.

2 indicates the usual box-support or table upon which the boxes are held, movable vertically on ways 10 on the side frame by means of screws 11, (shown in dotted lines in Fig. 1,) said screws engaging suitable threaded apertures in the rear of the central portion of the table and having at their upper ends worm-wheels 12, meshing with worms 13 (see dotted lines in Fig. 1) on a transverse shaft 14. Two or more of these adjusting-screws may be employed if the table 2 is large and heavy. By reason of the connection with the shaft 14 the rotation of said shaft will cause the vertical adjustment of the table or platform. In order that this vertical adjustment may be quickly accomplished, (as is necessary in a machine employed not only for nailing the cleats to the ends of boxes, but also fastening sides and bottom together as well,) I mount upon the end of the shaft 14 a belt-pulley 15, connected by a belt $6^\times$ with a corresponding pulley 17 on a suitable arbor 18 on the side of the machine, said pulley being adapted to be connected with the constantly-rotating driving-shaft 6, so that the worms and screws may be actuated in either direction from the said driving-shaft. In the present arrangement I mount upon the arbor 18 a lever 19, carrying, preferably below the center, gears 20 and 21, the former meshing with a corresponding gear on the pulley 17 and the latter connected to or formed with a friction-wheel 22, adapted when the lever is moved in one direction to engage a corresponding friction-wheel 23 on the shaft 6. Mounted also upon the lever 19 and on the other side of the pivot is a pinion 24, connected to a friction-wheel 25, which is also adapted when the lever is turned in one direction to coöperate with the friction-wheel 23 on the driving-shaft. As the driving-shaft is constantly rotated, it is only necessary to move the lever to bring the wheel 22 or 25 into contact with the friction-wheel 23 in order that the screws may be operated and the table or platform 2 moved up or down to bring it in proper relation to the nail-holding chucks for the operation desired. The lever 19 may be held in adjusted position by means of a pivoted slotted link 26, engaging a pin upon it.

Mounted upon the table or platform 2 is a frame or support for the article into which the nails are to be driven, composed, preferably of the end brackets 30 and the supporting-bars 31, extending longitudinally between them and transversely of the machine, and between these bars is arranged a nail-clenching anvil or bar 32, having at its end depending arms 33, which rest upon the short arms 34, attached to the ends of a shaft 35, extending across the front of the machine, an arm 36 being also attached to said shaft for oscillating it and raising the anvil 32 above the bars 31 for the purpose of clenching the nails, as will be described. The lower end of the lever 36 is connected to a link 37, supported at the opposite end by a link 38, pivoted to a bracket 39 on the main frame, the rear end of said link 37 being preferably provided with a steel shoe $30^\times$, with which is adapted to engage an arm or lever 41, secured rigidly to the intermittingly-rotated shaft 5, the construction being such that when the arm 41 moves the link 37 forward the anvil will be raised to the position shown in Figs. 1 and 2.

The nail chucks or holders (indicated generally by 45) embody suitable nail-holding jaws and channels, to be presently described, and are attached to the transverse bars 46 and 47, the former being preferably rigidly attached to brackets 48, secured to the main frame, and the latter to blocks 49, sliding in suitable ways formed in the brackets 48, and as the alternate nail-chucks are attached to the bars 46 and 47 it will be seen that by the adjustment of the blocks 49 the chucks may be moved so that the nails may all be driven in a straight line or in two separate lines, and when adjusted the blocks 49 may be rigidly secured by suitable set-screws having operating-handles 50, as in Figs. 5 and 9.

51 indicates the nail drivers or punches, each having a head 52 at its upper end beneath the cross-bar $3^\times$ of the driver-frame, said heads being provided with the downward extensions 53 on one side, and the drivers entering the chucks on the movable supports 47 are connected to a cross-bar 54, having at its ends blocks 55, movable forward and back in guides 56 on the ends of the driver bar or frame, as in Figs. 5 and 12. The front of the bar 54 is recessed at $54^\times$, and attached to said bar is a plate 57, extending beneath the lugs 53 on the driver-heads and causing the said drivers to move with the bar 54 back and forth beneath the driver-bar $3^\times$, while their heads maintain contact with the lower side of said bar $3^\times$, so that whatever the position of the drivers they will be reciprocated with the driving-frame. The plate 57 is held in its upper position to secure the drivers by screws $55^\times$, passing through them, the heads of said screws coöperating with the countersunk recesses $56^\times$, while by withdrawing the screws the slots in the plate will allow the latter to move downward and release the heads, permitting the removal of the drivers when desired. The heads of the drivers operating in the stationary chucks are secured in position by a recessed plate 58, secured to the front of the bar $3^\times$ and having slots 59 coöperating with screws or studs 60, the lugs 53 on said drivers extending over flanges on the plates 58, the construction being such that by moving the plates 58 longitudinally in the direction of the arrow, Fig. 5, and then downward the drivers can be tipped so that the lugs or flanges 53 will be disengaged from the plate and the drivers removed, if necessary. This manner of connecting the drivers with the driving-bar $3^\times$ permits of their adjustment laterally of the machine with the nail-chucks, which, as usual, may be adjusted on the bars 46 and 47, and the forward and rear adjustment of the chucks attached to the supports 47 may also be readily accomplished in order to change the relative positions of the nails in the box or board.

The specific form of chucks herein shown embodies the usual lateral swinging jaws 62, operated upon by springs to bring their lower ends together and hold the nail while being driven, as in Fig. 10, and the back plate 64, instead of being rigidly attached, as usual, is capable of being moved rearwardly when the nail-passage becomes clogged (by reason of displaced nails) and is attached to forwardly-extending rods 65, passing through the chuck-body, and having springs 66 interposed between the outer heads of said rods and the chucks, as shown in Figs. 7, 8, and 9, this construction being such that when the nail-channel becomes clogged or the nail encounters a hard substance instead of damaging the driver or the chuck itself the back plate 64 may yield, as shown in Fig. 7, allowing the driver to pass down and by it, the loose connection between the head of the driver and the driving-bar $3^\times$ permitting the slight lateral movement necessary.

The nail-conducting tubes 70, which receive the nails from the selecting or delivering apparatus in the present embodiment, are secured rigidly to the upper portion of the frame by screws passing through the perforated ears 71, and the upper ends of said tubes 70 are constructed, as indicated in Fig. 10 in plan, with a throat 72, through which the bodies of the nails pass, while their heads are delivered into the notches of the feeding disks or selectors 74, as in dotted lines in Fig. 8 and full lines in Fig. 11, and said tubes are also provided with the rib 75 at one side of said channel, so that the disks, moving in the direction indicated by the dotted arrow in Fig. 8, will carry the nails around, and as the latter are released by engaging the surface 77, which moves them out of the notches, their ends, as they tilt, will engage the rib 75 and be prevented from passing back into the channel 72 and clogging the same, preventing the subsequent nail from being entered in the selector. From the tubes 70 the nails pass to the telescoping conductors 78 and thence into the nail-channels in the chucks.

I do not deem it necessary herein to show the nail-pan and the devices for conveying the nails therefrom to the selectors or pickers or the details of the selectors, as these may be of any suitable construction or as contained in my pending application, Serial No. 601,377, filed August 1, 1896.

Returning now to the operation of the nail-clenching devices first described, it may be stated that this is only to be used when it is desired to fasten cleats to the end boards of boxes, although the attachment remains a permanent part of the machine, and in order to support boxes being nailed and also to support boards when attaching cleats, as in Fig. 2, I arrange upon the supporting table or platform 2 a bridge or bracket $2^\times$. Of course instead of having both the clenching devices and the support $2^\times$ above the top of the platform the clenching device could be arranged at about or below its surface, but as it may be desirable to utilize the whole surface of the table I preferably make the parts removable, as shown.

The arm 41 on the shaft 5 and the crank on said shaft operating the driver-frame are so positioned relatively that when driving the nails to secure cleats on boards, as in Fig. 2, the drivers will first descend, moving the nail through the material freely, as the anvil 32 is then below the surface of the work-supports or bars 31. Then while the drivers still press upon the nail and are at their lowest position the arm 41, engaging the link 37, raises the clenching-anvil quickly, turning the points of the nails and clenching them, as shown in Fig. 2. When it is desired to nail the tops or sides on the boxes, the links 37 and 38 are disconnected, as shown in Fig. 3, and the table or platform is lowered, preferably by means of the power devices heretofore described, the proper distance below the nail-chucks, and the boxes then resting upon the supports 31 and $2^\times$ on the table are nailed in the usual manner. When, however, boxes having cleats at the ends are to be nailed, it is necessary that the cleats should be supported while the nails are being driven into it, and for this purpose I employ a detachable cleat-supporting bracket 80, having a forward portion adapted to project beneath the box-cleat, as shown in Fig. 4, and the rearward hooked portion adapted to project over the block 81, movable vertically in a slot in the frame by means of a screw 82, operated by a hand-wheel 83, said screw enabling the proper adjustment to be quickly secured.

When the machine is used for nailing boxes not having cleated ends, the cleat-support 80 may either be removed or serve as a gage for limiting the backward movement of the box, as desired.

Machines embodying the improvements described are well adapted for general nailing and particularly for box-making, as not only may the cleated ends be formed and the nails therein clenched, but all the boards can be nailed together whether the nails are to be driven into the cleats and box ends alternately, as in Fig. 2, or in a straight line.

The power devices for adjusting the table or platform are desirable in a machine of this general description, whether or not it is supplied with the other attachments, for the reason that said table is usually quite heavy and strong and it requires considerable power and time to raise it by hand.

I claim as my invention—

1. In a nailing-machine, the combination with the main frame, the nail-holders, the drivers and the driver-frame, and the intermittently-actuated crank-shaft for operating the driver-frame, of the vertically-adjustable work-holding table, a nail-clenching device thereon coöperating with the drivers, and direct connections between said clenching device and the intermittently-rotated shaft for operating the former, the constantly-rotating shaft from which the intermittently-rotating shaft is actuated, adjusting devices for moving the table vertically, and detachable and reversible connections between the constantly-rotating shaft and the adjusting devices, whereby the work-table may be quickly adjusted to different heights.

2. In a nailing-machine, the combination with the main frame, the nail-holders thereon, the drivers, the driver-frame movable on the main frame, the work-table adjustable on the main frame, the screw for operating it, the worm-wheel 12, the worm and the worm-shaft, and the belt-wheel thereon, of the driving-shaft, the friction-wheel 23, the belt-wheel 17, the gear thereon and the belt, the gears 20, 21 and 24, the lever 19, and the wheels 22 and 25, arranged and operating substantially as described.

3. In a nailing-machine, the combination with the nail-holder, the nail-driver, the movable driver-frame, and the crank-shaft actuating the frame, of the stationary work-support 31, the movable nail-clenching anvil normally below the plane of the support, and connections between the crank-shaft and anvil for raising the latter, while the driver-frame is held in lowest position, thereby clenching the end of the nail while it is held by the driver, substantially as described.

4. In a nailing-machine, the combination with the nail-holder, a nail-driver, and a rotary shaft connected to the driver for actuating it, of the stationary work-support out of the path of the nail, the movable nail-clenching anvil in the path of the nail, the lever 36 for actuating the anvil and the arm 41 on the rotary shaft actuating the lever to raise the anvil and clench the nail when the driver has reached the limit of its downward movement and is at rest, substantially as described.

5. In a nailing-machine, the combination with the work-support 31, the vertically-movable nail-clenching anvil at the side of the support, the lever 36 connected to the anvil for raising it, the links 37 and 38, the rotary shaft 5, and the arm 41 engaging the link to operate the anvil, substantially as described.

6. In a nailing-machine, the combination with the nail-driving mechanism, the stationary work-support 31, the movable nail-clenching anvil 32, the shaft 35, arms 34 engaging the anvil, the lever 36, and the rotary shaft 5 having the arm 41 for engaging and operating the lever 36, substantially as described.

7. In a nailing-machine, the combination with the main frame having the slot for the cleat-holder, nail-holders and driving devices, and a work-support beneath the nail-holders, of the block 81 movable in the slot in the frame and in rear of the front, the adjusting-screw 82 connecting the frame and block, and the removable bracket 80 having the hooked portion for extending over the block and arranged to support a cleat beneath the drivers, substantially as described.

8. The combination with the nail-holding chuck having the nail and driver channels, of the pivoted nail-holding jaws, and the back plate between which and the chuck-body the jaws are pivoted, said plate yielding in a plane parallel with the jaw-pivots, substantially as described.

9. The combination in a nail-holding chuck having the driver-channel, of the nail-holding jaws pivoted to the chuck-body, the back plate between which and the body the jaws are pivoted, having the rods and springs and movable in a plane parallel with the jaw-pivots, substantially as described.

10. In a nailing-machine, the combination with the main frame, the brackets 48, the supports 46 thereon, the blocks 49 movable on the brackets 48, and the supports 47, of the nail-holders mounted adjustably on the supports 46 and 47, substantially as described.

11. In a nailing-machine, the combination with the nail-holders, of the movable driver-bar, the drivers having the laterally-extending heads arranged in contact with the under side of the bar and provided with the downward extensions 53, the vertically-adjustable front plate 58, having the recess for the extensions 53 on the driver-heads, and securing devices for holding the plate 58 in elevated position, substantially as described.

12. In a nailing-machine, the combination with the nail-holders, of the movable driver-bar, the bar 54 sliding beneath the driver-bar having the longitudinal recess, the plate adjustably connected to the bar 54, and the drivers having the heads engaging the driver-bar and supported by the bar 54 and the plate, substantially as described.

13. In a nailing-machine, the combination with two series of nail-holders and supports for each series adjustable relatively, of two series of drivers having the heads, the driver-bar with which said heads engage, the plate 58 on the driver-bar engaging the heads of one series of drivers, the movable bar 54 with which the heads of the other series of drivers engage, and the securing-plate 57 connected thereto, substantially as described.

14. In a nailing-machine, the combination of the driver-bar, the drivers having the heads and the depending lugs, the front plate 58 having the flange engaging the lugs and the slots 59, and the studs or screws 60, substantially as described.

15. The combination with the nail-supports having channels, and the rotary selector having recesses therein for engaging the nails beneath their heads, of the nail-conductors having the nail-passage, the throat 72 and the rib 75 between the throat and nail-passage, substantially as described.

HENRY W. MORGAN.

Witnesses:
F. F. CHURCH,
F. A. PADDOCK.